W. NAKAGAWA.
TUBE EXPANDER.
APPLICATION FILED NOV. 29, 1918.
1,433,028.
Patented Oct. 24, 1922.
2 SHEETS—SHEET 1.
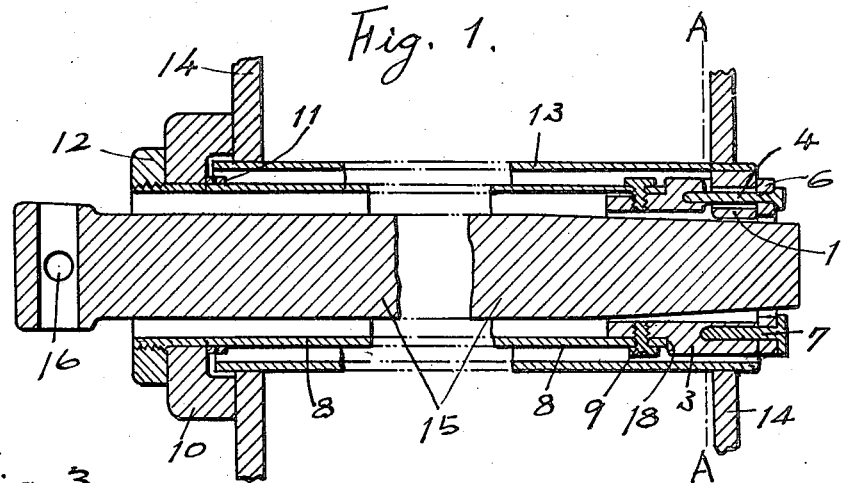
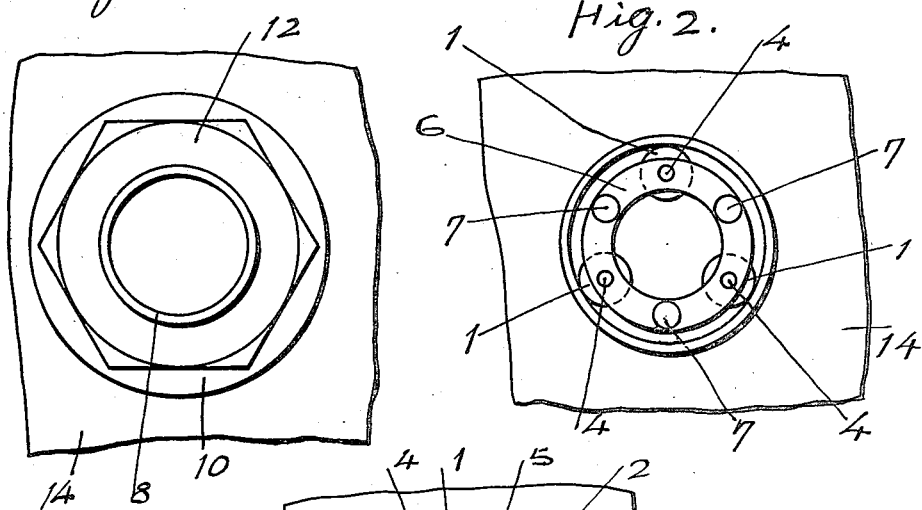
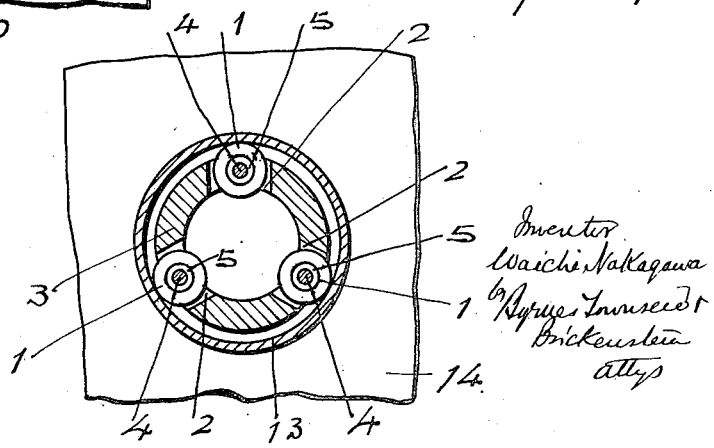

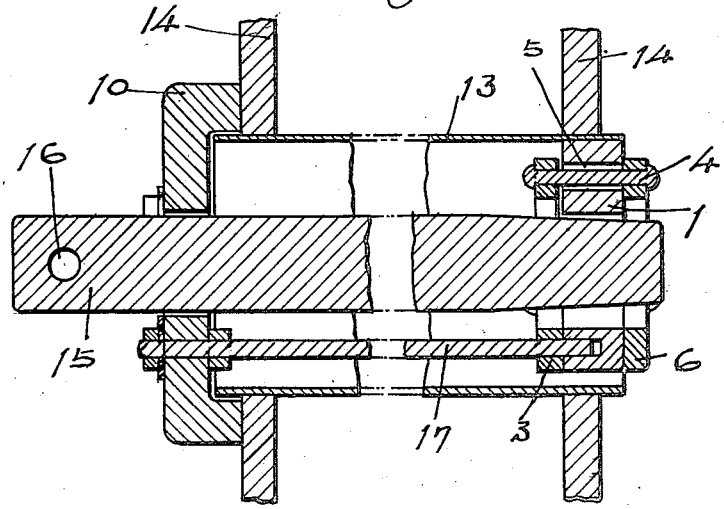
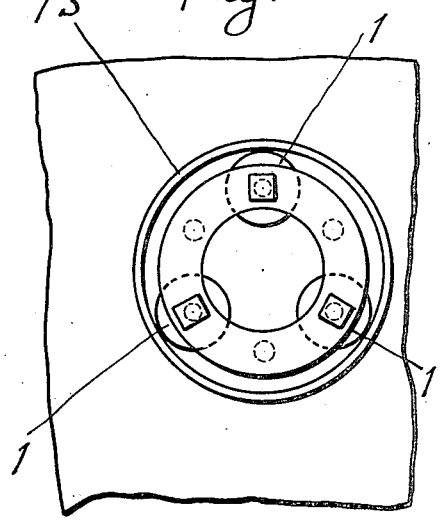
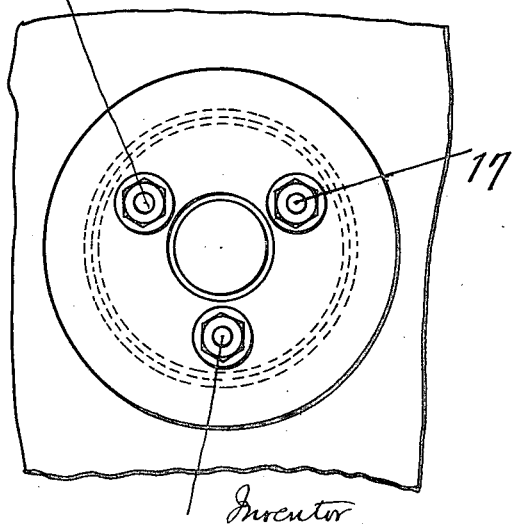

Patented Oct. 24, 1922.

1,433,028

UNITED STATES PATENT OFFICE.

WAICHI NAKAGAWA, OF KITAKU, JAPAN.

TUBE EXPANDER.

Application filed November 29, 1918. Serial No. 264,776.

*To all whom it may concern:*

Be it known that I, WAICHI NAKAGAWA, a subject of His Majesty the Emperor of Japan, residing at No. 43—A Tomijimacho, Kitaku, Osaka, Japan, have invented certain new and useful Improvements in and Relating to Tube Expanders, of which the following is a specification.

This invention relates to improvements in tube expanders and particularly to expanders of novel form to be used for repairing any leaky joint at the rear end of fire tubes particularly in marine type boilers.

According to this invention, a plurality of rollers are loosely mounted in recesses or openings formed on a suitable ring-shaped member, by means of pins in such a manner that a part of the rollers projects normally out of said ring member; and this member is connected to one end of either a suporting pipe or rods, the other end of which is provided with a suitable abutment, which is perforated at the center for the passage of the usual operating rod.

In order that the nature and the scope of this invention may be well understood, reference may be had to the following description and accompanying drawings, in which;

Fig. 1 shows an embodiment of this invention, in a longitudinal section;

Fig. 2 is a rear end view of the same;

Fig. 3 is a front end view of the same;

Fig. 4 is a cross sectional view on the line A—A of Fig. 1;

Fig. 5 shows a modified embodiment in a longitudinal section;

Fig. 6 is a rear end view of the above modified form;

Fig. 7 is a front end view of the same.

Referring now to Fig. 1 to Fig. 4, inclusive, a plurality of rollers 1 is loosely mounted each in a recess or opening 2 formed through the side wall of a ring shaped member 3, by means of a pin 4 for each roller 1. In order that the tube expander may be adapted for use upon tubes of different diameter, the openings 2 may be sufficiently large so that a wide clearance is obtained around the spindle 4.

A ring shaped cover 6 is fixed to the outer end of the member 3, by means of screws 7. The pins 4 of the rollers 1 pass through this cover 6, and are fixed with their inner ends to the member 3, whereby the rollers 1 will be held in the openings 2, but may be forced outwardly against the tubes.

A shoulder 18 is formed externally around the inner end of said ring shaped member 3, and this end is inserted into the rear end of the supporting pipe 8, and firmly connected thereto by means of screws 9.

The front end of the supporting pipe 8 carries an abutment 10 defining an annular or cylindrical flange for contact with the front plate. The abutment may be conveniently attached to the pipe 8 by means of a collar 11 and a nut 12 as shown in Fig. 1.

If a joint between the rear end of any fire tube 13 and an end plate 14 of a boiler becomes leaky and is to be repaired, the tube expander of this invention is inserted through the front end of the tube 13 and the flange of the abutment placed over the projecting tube in contact with the front plate. It is understood that the parts are so related that in this position the rollers bear upon the leaky joint.

Then the operating rod 15 the outer end of which is provided with a hand lever hole 16, is inserted through the supporting pipe 8 and forced or pressed inwardly and rotated by means of a suitable hand lever.

In this operation, the rollers 1 are forced out from the openings 2 and pressed upon said leaking joint at the rear end of the fire tube 13.

A modified form, illustrated in Fig. 5 to Fig. 7, inclusive, differs from the above described one in such a point only that a plurality of supporting rods 17 is used instead of the supporting pipe 8. This modified tube expander also may be applied to any leak joint in the same manner as above described.

I claim:

A tube expander for expanding fire tubes adjacent the rear plate, comprising a ring-shaped member having openings, rollers loosely mounted in the openings, an expanding pin for forcing the rollers outwardly and means for supporting the ring-shaped member in a definite operative position relatively to the rear plate, said means including a tubular element detachably connected to said member and carrying at its free end a flange having at its periphery an inwardly extending cylindrical portion adapted to bear upon the front plate of the boiler, the flange being detachably connected to the tubular element.

In testimony whereof I affix my signature.

WAICHI NAKAGAWA.